United States Patent [19]
Huber

[11] Patent Number: 5,321,543
[45] Date of Patent: Jun. 14, 1994

[54] APPARATUS AND METHOD FOR LINEARIZING AN EXTERNAL OPTICAL MODULATOR

[75] Inventor: David R. Huber, Warrington, Pa.

[73] Assignee: General Instrument Corporation, Hatboro, Pa.

[21] Appl. No.: 963,460

[22] Filed: Oct. 20, 1992

[51] Int. Cl.⁵ .............................................. H04B 10/04
[52] U.S. Cl. ...................................................... 359/187
[58] Field of Search ....................... 359/187, 180, 188

[56] References Cited

U.S. PATENT DOCUMENTS

| | | | |
|---|---|---|---|
| 4,611,352 | 9/1986 | Fujito | 359/187 |
| 5,132,829 | 7/1992 | Tzeng | 359/187 |
| 5,161,044 | 11/1992 | Nazarathy | 359/187 |
| 5,166,509 | 11/1992 | Curran | 359/187 |

OTHER PUBLICATIONS

H. Skeie, et al., "Linearization of Electro-Optic Modulators by a Cascade Coupling of Phase Modulating Electrodes," *Integrated Optical Circuits*, SPIE vol. 1583, 1991, pp. 153-164.

Nazarathy, et al., "Externally Modulated 80 Channel AM CATV Fiber to Feeder Distribution System over 2×30 Km Total Fiber Span" Broadband Analog and Digital Optoelectronics, Santa Barbara, Calif. Jul. 29-30, 1992 pp. 12-14 Summer Topicals IEEE Laser and E-O Society.

*Primary Examiner*—Leslie Pascal
*Attorney, Agent, or Firm*—Barry R. Lipsitz

[57] ABSTRACT

An external optical modulator is linearized to reduce second order distortion. An optical carrier is modulated in the modulator by a pilot signal. The modulated optical carrier is sampled and an error signal is generated indicative of a phase difference between a second harmonic of the pilot signal and second order harmonics thereof present in the sampled modulated optical carrier. The error signal is fed back to the modulator to adjust the bias thereof to minimize the phase difference and thereby minimize second order distortions produced by the modulator. Where a plurality of external modulators are operated in series, each is provided with a feedback loop to minimize the second order distortions produced therein.

20 Claims, 3 Drawing Sheets

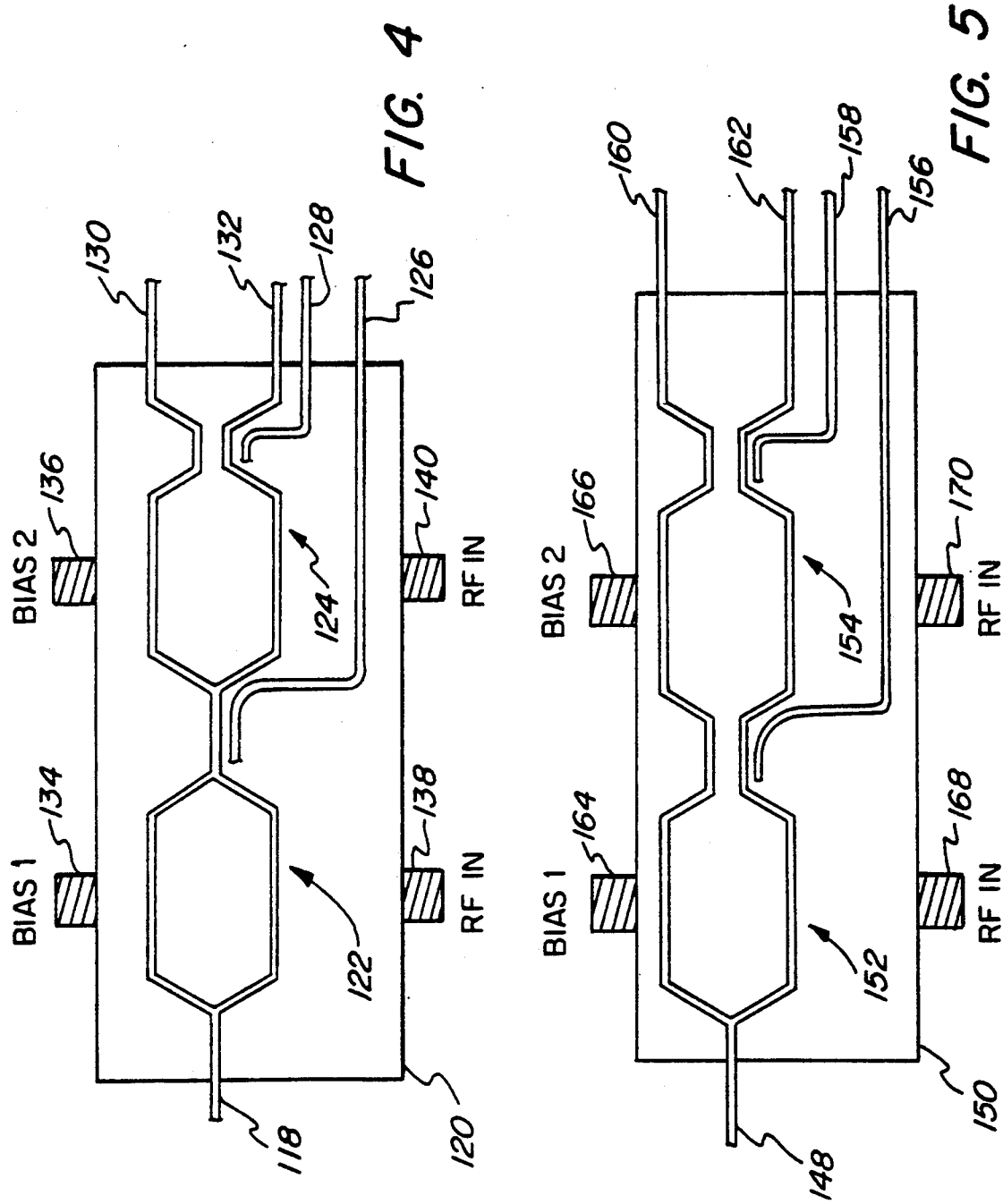

APPARATUS AND METHOD FOR LINEARIZING AN EXTERNAL OPTICAL MODULATOR

BACKGROUND OF THE INVENTION

The present invention relates to optical modulators, and more specifically to a technique for linearizing the output of an external optical intensity modulator.

Recently, there has been a growing interest in the development of analog, amplitude modulated optical communication systems. In comparison with digital systems, analog communication systems provide an efficient use of bandwidth. This is particularly useful in cable television (CATV) transmission system applications, where it is necessary to transmit a large number of video channels through an optical fiber. Compatibility with existing equipment is achieved by using the same signal format for optical transmission that is in use for coaxial cable signal transmission.

In order to transmit an information signal (e.g., a television signal) over an optical fiber, a light beam ("carrier") must be modulated with the information signal. The "electrooptic effect" has been advantageously used to provide modulators for this purpose. For example, electrooptic modulators using miniature guiding structures are known which operate with a low modulating power.

In electrooptic modulators, the electric field induced linear birefringence in an electrooptic material produces a change in the refractive index of the material which, in turn, impresses a phase modulation upon a light beam propagating through the material. The phase modulation is converted into intensity modulation by the addition of polarizers or optical circuitry. Ideally, an electrooptic modulator should have a linear relationship between its output optical power and the applied modulating voltage.

In a "Mach Zehnder" type electrooptic modulator, an optical carrier (laser beam) is split into two paths. At least one path is electrically phase modulated. The two signals are then recombined in an interferometer to provide an intensity modulated carrier. Typically, lithium niobate ($LiNbO_3$) is used as the electrooptic material. Waveguides in such materials are readily formed by titanium indiffusion.

The output power curve of a Mach Zehnder modulator is nonlinear. Practical analog optical communications systems, however, demand a high linearity. See, for example, W. I. Way, "Subcarrier Multiplexed Lightwave System Design Considerations for Subscriber Loop Applications", J. Lightwave Technol., Vol. 7, pp. 1806–1818 (1989). Modulator nonlinearities cause unacceptable harmonic and intermodulation distortions. When it is necessary to communicate a large number of channels, as in a CATV application, intermodulation distortions ("IMD") can impose serious limitations on the system performance.

The problem of intermodulation distortions, and particularly second order distortion, is complicated by the fact that lithium niobate is an inherently unstable material. Thus, it is not possible to simply bias a Mach Zehnder modulator (e.g., to operate at its quadrature point) and then expect the modulator to continue to run at the desired operating point. In fact, the bias condition will dynamically change due to factors such as temperature, photorefractive instability, and displacement currents within the lithium niobate material. Thus, additional steps must be taken to ensure that the external modulator will run over time without an increase in second order distortion.

It would be advantageous to provide a technique that dynamically tracks the second order distortion performance of an external optical modulator and maintains such performance at an acceptable level. It would be further advantageous to provide such a technique that can be used with a single optical modulator or a plurality of such modulators cascaded in series. The present invention provides a method and apparatus enjoying the aforementioned advantages.

SUMMARY OF THE INVENTION

In accordance with the present invention, a method is provided for linearizing the operation of an external optical modulator. An optical carrier is modulated in the modulator by a pilot signal. The modulated optical carrier is sampled from the modulator. An error signal is generated which is indicative of a phase difference between a second harmonic of the pilot signal and second order harmonics of the pilot signal present in the sampled modulated optical carrier. The error signal is fed back to the modulator to adjust a bias thereof to minimize the phase difference and thereby minimize second order distortions produced by the modulator.

In an illustrated embodiment, the pilot signal is mixed with an information signal (e.g., CATV signals) for modulation of the carrier in the modulator by both the pilot signal and the information signal. An embodiment is also disclosed wherein a plurality of external modulators are coupled in series. Each of the modulators receives a pilot signal for modulating the optical carrier. For each modulator, the modulated optical carrier output therefrom is sampled and an error signal is generated indicative of a phase difference between a second harmonic of the pilot signal input to the modulator and second order harmonics of the pilot signal present in the sampled modulated optical carrier. The error signal for each modulator is fed back to adjust the bias of the modulator and thereby minimize the phase difference between the second harmonic of the pilot signal and second order harmonics of the pilot signal present in the sampled modulated optical carrier. In this manner, second order distortions produced by the modulators are minimized.

Apparatus in accordance with the present invention includes means for modulating an optical carrier signal by an information signal and a pilot signal. The modulated optical carrier signal is sampled from the modulating means, and an error signal is generated indicative of a phase difference between a second harmonic of the pilot signal and second order harmonics of the pilot signal present in the sampled modulated optical carrier signal. Means are provided for feeding the error signal back to the modulating means to adjust a bias thereof in order to minimize the phase difference. In this manner, second order distortions produced by the modulating means are minimized.

In an illustrated embodiment, means are provided for mixing the information signal with the pilot signal for input to the modulating means as a combined signal to modulate the carrier. The modulating means can comprise a plurality of external modulators in series, each receiving the pilot signal at a modulating signal input thereof. Each modulator comprises means for sampling the modulated optical carrier from the modulator, means for generating an error signal indicative of a phase difference between a second harmonic of the pilot signal and second order harmonics of the pilot signal present in the sampled carrier, and means for feeding the error signal back to the modulator to adjust a bias thereof to minimize the phase difference.

In an illustrated embodiment, the pilot signal comprises a first tone having a frequency $f_S$. The means for generating the error signal comprise an oscillator providing a second tone having a frequency 2 $f_S$ phase locked to the first tone. Means are provided for mixing the second tone with the sampled modulated optical carrier to recover second order harmonics of the first tone. Phase comparator means compare the phase of the second tone to the phase of the recovered second order harmonics. Means responsive to the phase comparator generate an error signal having a sign and magnitude that correspond to the magnitude and direction of a phase difference detected by the phase comparator means. In one embodiment, the modulator(s) comprises a Mach Zehnder modulator(s) having a separate bias input(s) for receiving the error signal. In another embodiment, the modulating means comprise a directional coupler. In an embodiment using series modulators, a Mach Zehnder modulator can be followed by a directional coupler. In an alternative arrangement, a first directional coupler can be followed by a second directional coupler. In either embodiment, the modulators can be provided with separate bias inputs for receiving the error signal. Further, the error signal for each modulator in a plurality thereof is preferably fed back to its respective modulator in a feedback loop that has a time constant which is shorter than that of the following modulator in the series of modulators.

BRIEF DESCRIPTION OF THE FIGURES

FIG. 4 is a schematic illustration of an embodiment wherein the external modulator comprises a Mach Zehnder modulator followed by a series coupled directional coupler; and FIG. 5 is a schematic representation of an external modulator comprising a pair of series coupled directional couplers.

DETAILED DESCRIPTION OF THE INVENTION

Figure 3:
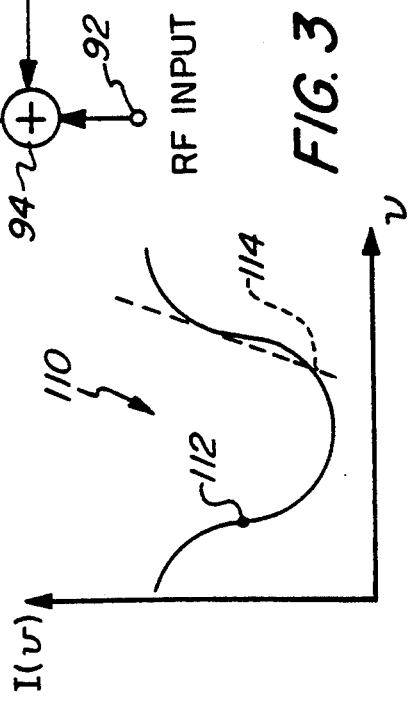
FIG. 3 is a graph illustrating the quadrature operating point of an external modulator.

External modulators used in connection with optical signal distribution systems must provide linear operation over a relatively large modulation range. However, such modulators typically produce rather large second order distortions, which must be reduced in order to allow the practical use of such modulators. Ideally, an external modulator (such as a Mach Zehnder modulator) should be operated at its quadrature operating point, where the most linear operation can be achieved. This is illustrated in FIG. 3, which is a plot of the modulator output power intensity $I(v)$ with respect to modulating voltage $v$. As plot 110 illustrates, approximately linear operation as designated by dashed line 114 is provided at the quadrature operating points (e.g., point 112) of the modulator.

Figure 1:
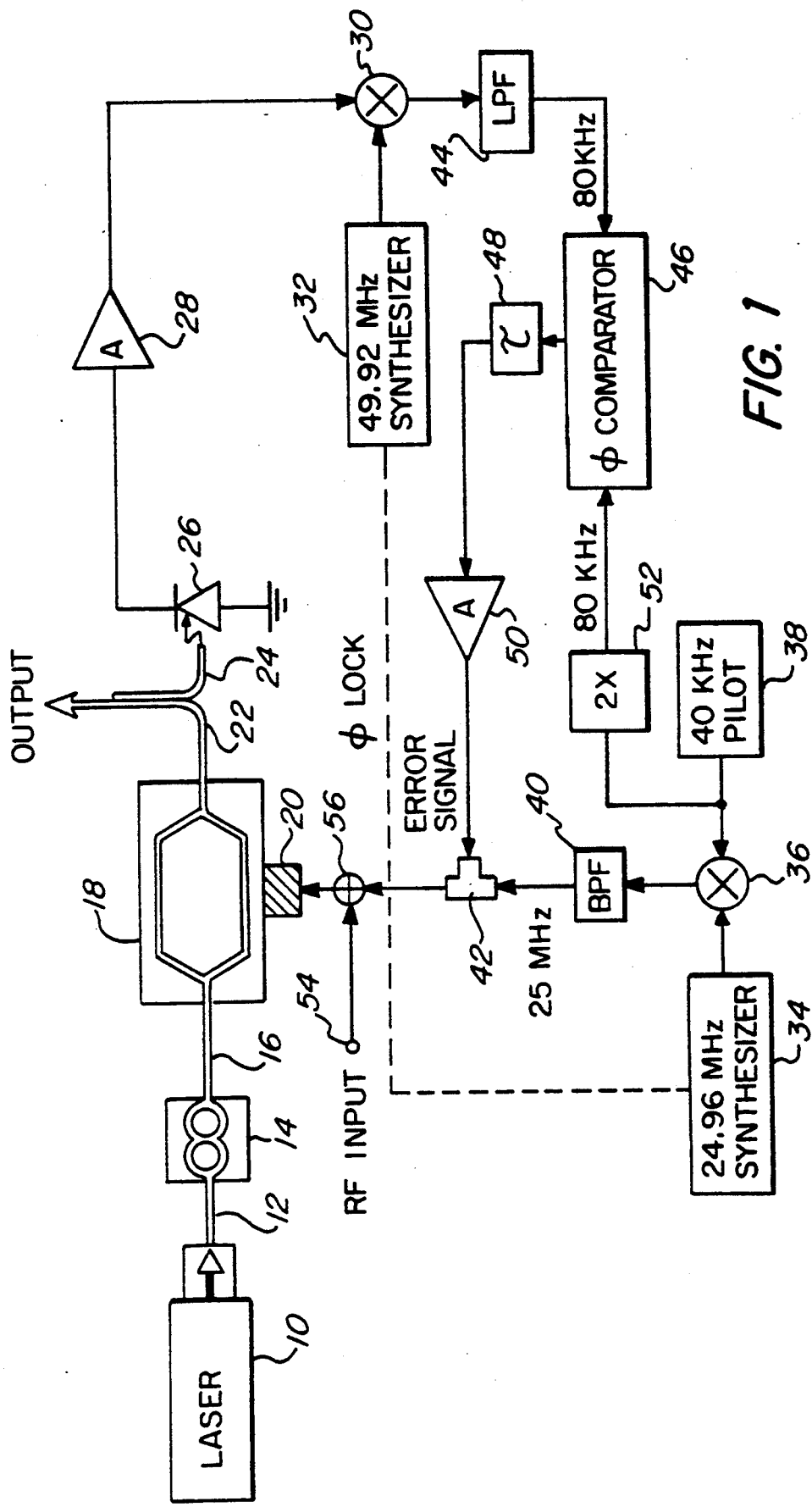
FIG. 1 is a block diagram showing a first embodiment of the invention that uses a double heterodyne arrangement for providing an error signal to reduce second order distortions in a Mach Zehnder modulator.

The present invention maintains operation at or about the quadrature operating point 112, thereby reducing second order distortions, using a feedback arrangement in which a phase difference caused by the second order distortion is monitored and minimized. One embodiment of the invention is illustrated in FIG. 1, in which an optical carrier signal is provided by a laser 10. The optical carrier is communicated via an optical path 12 to a polarization transformer 14 that optimizes the orientation of the E field from the laser with respect to the crystal axis of a Mach Zehnder modulator 18. The polarization transformer 14 is coupled to Mach Zehnder modulator 18 via optical path 16 in a conventional manner. Mach Zehnder modulator 18 will modulate the optical carrier input thereto by a modulating signal applied at a modulating input 20. The resultant modulated carrier is output from the Mach Zehnder modulator via optical output path 22.

In accordance with the present invention, the modulated optical carrier from the external modulator 18 is sampled via a coupler 24, that outputs the sampled light to a photodetector 26. Photodetector 26 converts the sampled energy into the electrical domain, where it is amplified by an amplifier 28 prior to input to a mixer 30. In mixer 30, the sampled signal is mixed with a mixing frequency from synthesizer 32. In the specific embodiment shown, synthesizer 32 outputs a 49.92 MHz periodic waveform.

Synthesizer 32 is phase locked to a synthesizer 34, that in the illustrated embodiment outputs a 24.96 MHz signal. The 24.96 MHz signal is mixed in a mixer 36 with a pilot tone from oscillator 38 (e.g., 40 kHz) and passed through a bandpass filter 40 to provide a 25 MHz signal for input via tee 42 to input port 20 of external modulator 18. This 25 MHz signal will appear together with an information signal as modulation on the sampled optical carrier from the external modulator.

The actual information signal to be carried on the optical carrier is input to the modulator 18 via an RF input terminal 54 and adder 56 in a conventional manner. Since the pilot tone used in connection with the second order phase comparison is well below the frequency of the desired information signal, the pilot tone does not interfere with the communication of the information signal.

The 40 kHz pilot tone will be present in the signal in the electrical domain input to mixer 30 from amplifier 28. Upon mixing this signal with the output of 49.92 MHz synthesizer 32, the second order distortion of the 40 kHz pilot tone, appearing at 80 kHz, will be output from mixer 30. This result can be seen in that the second harmonic of the 25 MHz signal input to the modulator appears at 50 MHz, which when mixed with the 49.92 MHz signal from synthesizer 32 results in the desired 80 kHz output (50.00−49.92 MHz=80 kHz). A low pass filter 44 limits the output from mixer 30 to the desired 80 kHz component, for input to a phase comparator 46.

A frequency doubler 52 doubles the original 40 kHz pilot tone from oscillator 38 to provide an 80 kHz output for comparison with the 80 kHz signal from low pass filter 44. Any phase difference between the two 80 kHz signals input to phase comparator 46 is determined, and output through an appropriate time delay 48 to an amplifier 50 for providing an error signal based on the phase difference. The error signal is input to tee 42, where it is combined with the 25 MHz output from bandpass filter 40 for input as a biasing signal to external modulator 18. Phase comparator 46 can comprise any conventional phase comparison circuit, such as a multiplier and a filter. Such phase comparators are well known in the art.

The error signal provided by the apparatus of FIG. 1 is indicative of a phase difference between the second harmonic of the pilot signal from frequency multiplier 52 and second order harmonics of the pilot signal present in the sampled modulated optical carrier from external modulator 18. The sign and magnitude of the error signal will inherently correspond to the magnitude and direction of the phase difference detected by the phase comparator 46. Thus, use of the error signal to bias external modulator 18 will tend to drive the phase difference to zero, by adjusting the operating point of the external modulator to quadrature. This has the effect of reducing second order distortions produced by the external modulator.

Figure 2:
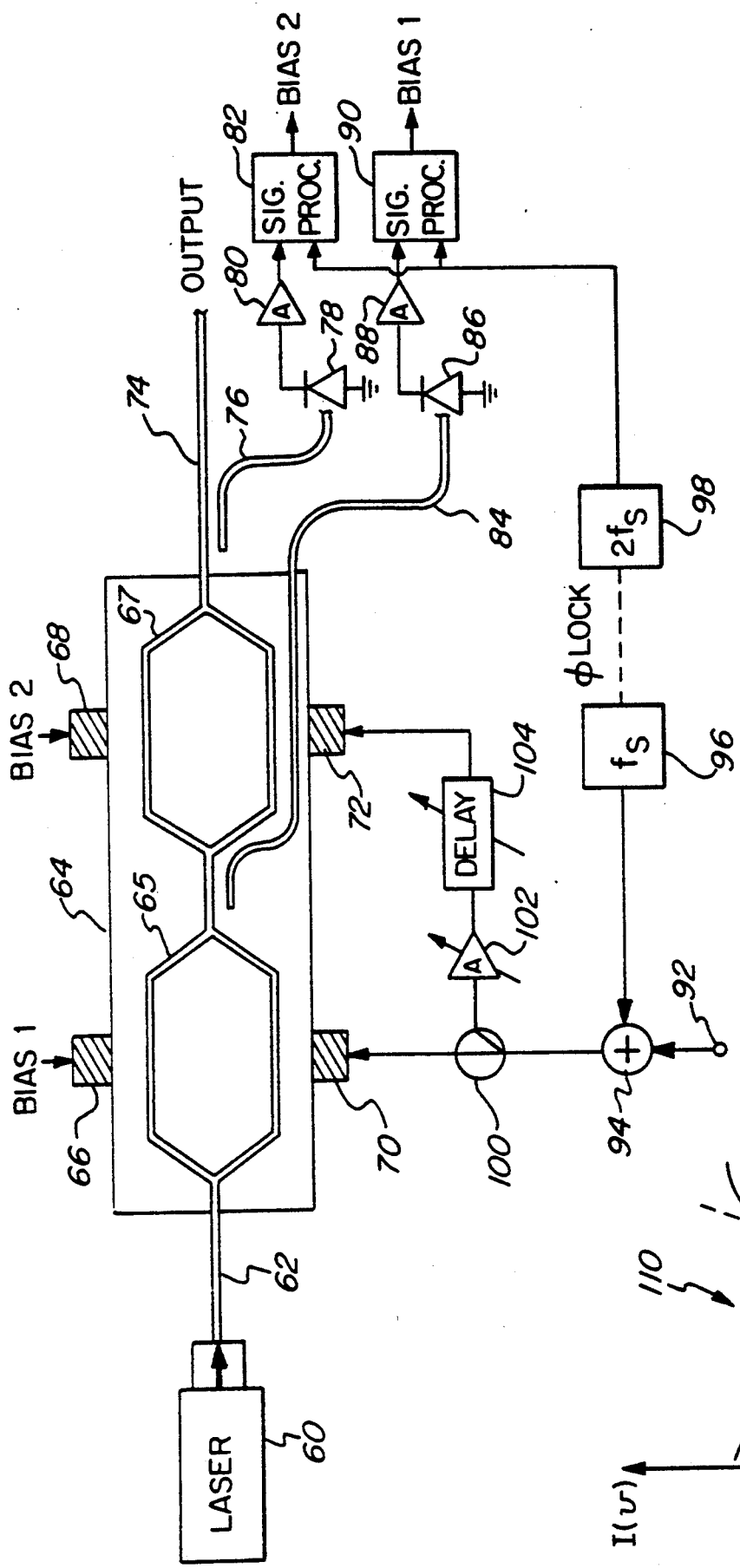
FIG. 2 is a block diagram of an embodiment for reducing second order distortions produced by a pair of series coupled Mach Zehnder modulators.

The present invention can also be used to linearize the operation of cascaded external modulators. An example of such an embodiment is illustrated in FIG. 2, wherein external modulator 64 comprises a pair of series coupled Mach Zehnder modulators 65, 67. Laser 60 is used to provide the optical carrier which is communicated to external modulator 64 via optical path 62. External modulator 64 contains separate bias inputs 66, 68 and separate modulating signal inputs 70, 72 for each of the Mach Zehnder modulators 65, 67, respectively. The outputs of modulators 65, 67 are sampled by optical paths 84, 76, respectively. The optical carrier modulated by modulator 64 is output via optical path 74 in a conventional manner.

The information signal to be modulated by external modulator 64 is coupled via terminal 92 to an adder 94, where it is combined with a reference frequency (pilot tone) $f_S$ generated by oscillator 96. The combined signal is input via input port 70 to the first Mach Zehnder modulator 65. A splitter 100 is provided to divert a portion of the input signal to input port 72 of Mach Zehnder modulator 67 via a variable gain amplifier 102 and variable delay 104. Third order distortions produced by external modulator 64 can be reduced by adjusting the gain of amplifier 102 and delay 104 as well known in the art.

The output from the first Mach Zehnder modulator 64 sampled via optical path 84 is input to a photodetector 86, amplified by an amplifier 88, and input to a signal processor 90 for comparison with the second harmonic of the pilot tone (2 $f_S$) output from oscillator 98. Oscillators 98 and 96 are phase locked to enable signal processor 90 to provide an error signal indicative of the phase difference between the second harmonic of the pilot signal output from oscillator 98 and second order harmonics of the pilot signal present in the sampled modulated optical carrier output from Mach Zehnder modulator 65. Signal processor 90 can comprise, for example, a phase comparator, time delay, and amplifier as illustrated by components 46, 48 and 50 of FIG. 1. The error signal output from signal processor 90 ("bias 1") is input to bias port 66 of modulator 64. This bias voltage adjusts the bias of Mach Zehnder modulator 65 to minimize the phase difference between the second harmonic of the pilot signal and second order harmonics of the pilot signal present in the output sampled via optical path 84, thereby minimizing second order distortions produced by Mach Zehnder modulator 65.

Similarly, photodetector 78, amplifier 80, and signal processor 82 are used to compare the phase of the second order harmonics of the pilot signal present in the output of Mach Zehnder modulator 67 with the second harmonic of the pilot signal from oscillator 98, thereby producing an error signal ("bias 2") that is input to bias port 68 of external modulator 64. This minimizes second order distortions produced by Mach Zehnder modulator 67.

By monitoring the outputs of both of the Mach Zehnder modulators in external modulator 64, and adjusting the respective biases, the second order distortions produced overall by external modulator 64 can be minimized.

FIGS. 4 and 5 illustrate alternative embodiments in which one or more directional couplers are used in an external modulator. In the embodiment illustrated in FIG. 4, external modulator 120 comprises a Mach Zehnder modulator 122 followed by a directional coupler 124. Separate bias and RF input ports 134, 138 are provided for Mach Zehnder modulator 122. Similarly, separate bias and RF input ports 136, 140 are provided for directional coupler 124. An optical carrier is input to the external modulator 120 via an optical path 118, and the modulated carrier is output from paths 130 and 132 provided by directional coupler 124. Second order distortions produced by Mach Zehnder modulator 122 are sampled via optical path 126. Second order distortions at the output of directional coupler 124 are sampled by optical path 128. The external modulator 120 of FIG. 4 can be substituted for the external modulator 64 illustrated in FIG. 2.

FIG. 5 illustrates an embodiment of an external modulator 150 that comprises two directional couplers 152, 154 coupled in series. Again, separate bias and RF input ports 164, 168 are provided for directional coupler 152 and separate bias and RF input ports 166, 170 are provided for directional coupler 154. The optical carrier is input to the external modulator 150 via optical path 148, and the modulated carrier is output from directional coupler 154 on optical paths 160 and 162. Sampling of the output of the first directional coupler 152 is provided by optical path 156. Sampling of the output of the second directional coupler 154 is provided by optical path 158. The external modulator 150 of FIG. 5 can be substituted for modulator 64 of FIG. 2.

It should now be appreciated that the present invention provides a method and apparatus for linearizing the operation of an external optical modulator, such as a balanced Mach Zehnder modulator. The invention takes advantage of the fact that second order distortion can be reduced by adjusting the modulator to operate at its quadrature bias point. A pilot signal is provided so that the phase difference between a second harmonic of the pilot signal and second order harmonics of the pilot signal present in the output of the modulator can be determined and minimized to maintain operation at or about the quadrature point. Additional feedback loops can be used for each of a plurality of external modulators operated in series. Independent adjustment of the series modulators enables effective reduction of the overall second order distortion provided by the external modulator.

Although the invention has been described in connection with various specific embodiments thereof, those skilled in the art will appreciate that numerous adaptations and modifications may be made thereto without departing from the spirit and scope of the invention as set forth in the claims.

I claim:

1. A method for linearizing the operation of an external optical modulator comprising the steps of:
    modulating an optical carrier in said modulator by a pilot signal;
    sampling said modulated optical carrier from said modulator;
    generating an error signal indicative of a phase difference between a second harmonic of said pilot signal and second order harmonics of said pilot signal present in said sampled modulated optical carrier; and
    feeding said error signal back to said modulator to adjust a bias thereof to minimize said phase difference and thereby minimize second order distortions produced by said modulator.

2. A method in accordance with claim 1 comprising the further step of:
    mixing said pilot signal with an information signal for modulation of said carrier in said modulator.

3. A method in accordance with claim 1 comprising the further steps of:
    providing a plurality of external modulators in series, each of said modulators receiving said pilot signal for modulating said optical carrier and, for each of said modulators:
        sampling the modulated optical carrier from the modulator;
        generating an error signal indicative of a phase difference between a second harmonic of said pilot signal and second order harmonics of said pilot signal present in the sampled modulated optical carrier; and
        feeding said error signal back to said modulator to adjust a bias thereof to minimize said phase difference and thereby minimize second order distortions produced by said modulator.

4. Linearized external optical modulator apparatus comprising:
    means for modulating an optical carrier signal by an information signal and a pilot signal;
    means for sampling the modulated optical carrier signal from said modulating means;
    means for generating an error signal indicative of a phase difference between a second harmonic of said pilot signal and second order harmonics of said pilot signal present in said sampled modulated optical carrier signal; and
    means for feeding said error signal back to said modulating means to adjust a bias thereof to minimize said phase difference and thereby minimize second order distortions produced by said modulating means.

5. Apparatus in accordance with claim 4 further comprising:
    means for mixing said information signal with said pilot signal for input to said modulating means as a combined signal to modulate said carrier.

6. Apparatus in accordance with claim 4 wherein said modulating means comprise:
    a plurality of external modulators in series, each of said modulators receiving said pilot signal at a modulating signal input thereof and, for each modulator:
        means for sampling the modulated optical carrier from the modulator;
        means for generating an error signal indicative of a phase difference between a second harmonic of said pilot signal and second order harmonics of said pilot signal present in the sampled carrier from the modulator; and
        means for feeding said error signal back to the modulator to adjust a bias thereof to minimize said phase difference.

7. Apparatus in accordance with claim 6 wherein:
    said pilot signal comprises a first tone having a frequency $f_S$; and
    said means for generating said error signal comprise:
        an oscillator providing a second tone having a frequency $2f_S$ phase locked to said first tone,
        means for mixing said second tone with said sampled modulated optical carrier to recover second order harmonics of said first tone;
        phase comparator means for comparing the phase of said second tone to the phase of said recovered second order harmonics; and
        means responsive to said phase comparator means for generating an error signal having a sign and magnitude that correspond to the direction and magnitude of a phase difference detected by said phase comparator means.

8. Apparatus in accordance with claim 7 wherein said modulators comprise Mach Zehnder modulators.

9. Apparatus in accordance with claim 8 wherein said Mach Zehnder modulators have separate bias inputs for receiving said error signal.

10. Apparatus in accordance with claim 6 wherein the error signal for each modulator in said plurality is fed back to its respective modulator in a feedback loop that has a time constant which is shorter than that of the following modulator in said series.

11. Apparatus in accordance with claim 6 wherein said series modulators comprise a Mach Zehnder modulator followed by a directional coupler.

12. Apparatus in accordance with claim 11 wherein said Mach Zehnder modulator and directional coupler each have a separate bias input for receiving said error signal.

13. Apparatus in accordance with claim 6 wherein said modulators comprise directional couplers.

14. Apparatus in accordance with claim 13 wherein said directional couplers have separate bias inputs for receiving said error signal.

15. Apparatus in accordance with claim 4 wherein:
    said pilot signal comprises a first tone having a frequency $f_S$; and
    said means for generating said error signal comprise:
        an oscillator providing a second tone having a frequency $2f_S$ phase locked to said first tone,
        means for mixing said second tone with said sampled modulated optical carrier to recover second order harmonics of said first tone;
        phase comparator means for comparing the phase of said second tone to the phase of said recovered second order harmonics; and
        means responsive to said phase comparator means for generating an error signal having a sign and magnitude that correspond to the direction and magnitude of a phase difference detected by said phase comparator means.

16. Apparatus in accordance with claim 15 wherein said modulating means comprise a Mach Zehnder modulator.

17. Apparatus in accordance with claim 16 wherein said Mach Zehnder modulator has a separate bias input for receiving said error signal.

18. Apparatus in accordance with claim 4 wherein said modulating means comprise a Mach Zehnder modulator.

19. Apparatus in accordance with claim 18 wherein said Mach Zehnder modulator has a separate bias input for receiving said error signal.

20. Apparatus in accordance with claim 4 wherein said modulating means comprise a directional coupler.

* * * * *